(12) United States Patent
Takahashi

(10) Patent No.: US 6,751,174 B1
(45) Date of Patent: Jun. 15, 2004

(54) DISC REPRODUCING SYSTEM

(75) Inventor: Yorio Takahashi, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 631 days.

(21) Appl. No.: 09/830,683

(22) PCT Filed: Sep. 30, 2000

(86) PCT No.: PCT/JP00/05891
§ 371 (c)(1),
(2), (4) Date: Aug. 13, 2001

(87) PCT Pub. No.: WO01/16951
PCT Pub. Date: Mar. 8, 2001

(30) Foreign Application Priority Data

Aug. 31, 1999 (JP) ............................................ 11/246203

(51) Int. Cl.7 .................................................. G11B 7/00
(52) U.S. Cl. ................................. 369/47.37; 369/47.43; 369/47.45; 369/47.47
(58) Field of Search ........................... 369/47.22, 47.33, 369/47.34, 47.35, 47.36, 47.37, 47.41, 47.43, 47.45, 47.47, 53.3, 53.31, 44.28

(56) References Cited

U.S. PATENT DOCUMENTS

| 4,607,358 | A | | 8/1986 | Maeda et al. |
| 5,170,675 | A | | 12/1992 | Kawashima |
| 5,200,944 | A | | 4/1993 | Souma |
| 5,646,921 | A | | 7/1997 | Yokota et al. |
| 5,805,548 | A | | 9/1998 | Ishihara et al. |
| 5,956,307 | A | * | 9/1999 | Koudo et al. ............ 369/47.43 |

FOREIGN PATENT DOCUMENTS

| EP | 0683488 | 11/1995 |
| JP | 57-210481 | 12/1982 |
| JP | 58-91536 | 5/1983 |
| JP | 5-50074 | 1/1986 |
| JP | 61-13481 | 1/1986 |
| JP | 64-84476 | 3/1989 |
| JP | 3-116472 | 5/1991 |
| JP | 4-1972 | 1/1992 |
| JP | 6-236638 | 8/1994 |
| JP | 7-262692 | 10/1995 |
| JP | 7-311214 | 11/1995 |
| JP | 7-312011 | 11/1995 |
| JP | 8-115566 | 5/1996 |
| JP | 8-185663 | 7/1996 |
| JP | 8-339549 | 12/1996 |
| JP | 9-55015 | 2/1997 |
| JP | 9-73729 | 3/1997 |
| JP | 9-120634 | 5/1997 |
| JP | 10-162525 | 6/1998 |
| JP | 10-283724 | 10/1998 |

* cited by examiner

Primary Examiner—Thang V. Tran
(74) Attorney, Agent, or Firm—Wenderoth, Lind & Ponack, L.L.P.

(57) ABSTRACT

A disc playback system according to this invention, as shown in FIG. 1, comprises a pickup 1 for reading information from an information disc 2 on which data are recorded at a constant linear velocity, a disc motor 16 for rotating the information disc 2, a digital signal processing means 7 for digitizing data according to the playback format of the information disc 2, an interface means 19 for transmitting the digitized data to an external device and a buffer memory 18 for temporarily containing the data, and further includes a means for detecting the linear velocity and track pitch of the information disc 2 to decide the reference value for the velocity control of the disc motor 16 on the basis of the detected values of the linear velocity and track pitch and the value of the maximum radius of the data record area. According to the so-constructed disc playback system, the maximum playback velocity of the system can be obtained even in the case of discs having different track pitches.

13 Claims, 2 Drawing Sheets

DISC REPRODUCING SYSTEM

TECHNICAL FIELD

The present invention relates to a disc playback system to be used in CD-ROM playback apparatus or the like and, more particularly, to a disc playback system for controlling the disc rotation velocity.

BACKGROUND ART

As common methods for controlling the disc rpm in conventional disc playback Systems, there are CAV (Constant Angular velocity) control under which the angular velocity is constant, CLV (Constant Linear velocity) control under which the linear velocity is constant, and further PCAV control in which the CAV control and the CLV control are combined. Since the CLV control among these-requires frequent acceleration or deceleration of the spindle motor at a time of accessing, there are various problems, such as delay of the access time, increases in the consumed power, and heat generation. Accordingly, with the recent speeding-up of the CD-ROM apparatus, the CAV control or the PCAV control has been commonly used at the time of playback of discs on which data are recorded by the CLV method.

Under the CAV control, for example in the case of CD, the error of approximately 1.2~1.4 m/s is tolerated in the linear velocity, but the value of the linear velocity is not recorded on the medium. Thus, some methods for measuring the linear velocity of an information disc containing data recorded by the CLV method, at the time of loading of the disc are suggested.

For example, in a disc playback apparatus disclosed in Japanese Examined Patent Application No.Hei-5-50074, the linear velocity of the medium is obtained by forcefully transporting the pickup from the program start position of the information disc toward the inner radius by one track and counting the playback frame synchronization signal until the program start position is detected again. Under the CAV control, several percentages of the rotation velocity due to the error in the linear velocity is finely adjusted and the control of the rotation velocity of the disc is performed at a constant velocity. When the rpm is constant (CAV) at this time, because the linear velocity is higher at the outer radium of the disc, the playback velocity of data becomes higher. However, the maximum playback velocity conforming to the performance of the data playback circuitry has already been determined and thus the rotation velocity of the disc should be set so as not to exceed this maximum playback velocity, while the quantity of data recorded on the disc varies with discs. Therefore, following control means are suggested to solve this problem.

In the disc playback system disclosed in Japanese Published Patent Application No. Hei.7-312011, a method for calculating the outermost circumference position of a disc from TOC (Table of Contents) information of a CD-ROM and controlling the rotation velocity of the disc so as to obtain the maximum velocity in the system at the outermost circumference position containing recorded data is suggested.

In another disc playback system, a method for storing the outermost circumference position which has already been accessed, and controlling the rotation velocity of the disc so as to obtain the maximum velocity in the system at the stored address is also suggested in view of the fact that there are few cases where all data on the disc are used.

As described above, to calculate the maximum velocity, in the case of CD, the standards tolerate the error of approximately 1.2~1.4 m/s in the linear velocity. In addition to this, as for the space between tracks (hereinafter referred to as track pitch), its standard value is 1.6 μm while the standards accept the error in the range of 1.5~1.7 μm. For reference purposes, in the case of CD-ROM, the standard value of the track pitch is 1.6 μm. Therefore, by using this value, the outermost circumference radius for obtaining the maximum velocity in the system is calculated from the address information and linear velocity of the disc.

However, in this conventional disc playback system, in the case of a disc having a smaller track pitch than the standard value, the actual playback velocity at a radius of the outermost circumference position is lower than the maximum velocity in the system. On the other hand, in the case of a disc having a larger track pitch than the standard value, the actual playback velocity at a radius of the outermost circumference position is higher than the maximum velocity of the system. Thus, in the normal disc playback system, the playback velocity at the outermost circumference position should be decided using the permissible maximum track pitch, but when a disc having a smaller track pitch than the permissible maximum value is played back in this case, the maximum playback velocity of the system cannot be realized.

To be more specific, the track pitch of a CD-ROM has a range of 1.5~1.7 μm according to the standards. However, because there are discs out of the standards in practice, the target reading velocity cannot be realized or the reading velocity exceeding the processing capability of the system is obtained in the case of a disc having a value which is quite different from the standard track pitch (1.6 μm).

The present invention is made to solve the above-mentioned problems, and has its object to provide a disc playback system in which the maximum playback velocity of the system can be obtained even in the case of the disc having a different track pitch.

DISCLOSURE OF THE INVENTION

To solve these problems, a disc playback system of Claim 1 of the present invention comprises: a pickup for reading first information data recorded on an information disc on which data are recorded at a constant linear velocity, from the information disc; a disc motor for rotating the information disc; a digital signal processing circuit for digitizing the first information data according to a playback format of the information disc; an interface control circuit for transmitting second information data which are the data digitized by the digital signal processing circuit, to an external device; a buffer memory for temporarily containing the second information data which are requested by the external device via the interface control circuit; a linear velocity detection means for detecting a linear velocity of the information disc; and a track pitch detection means for detecting a track pitch of the information disc, and this disc playback system decides a reference value for controlling a velocity of the disc motor, on the basis of the linear velocity detected by the linear velocity detection means, the track pitch detected by the track pitch detection means, and a value of a maximum radius of a record area of data which are recorded on the information disc. Therefore, the accurate values of the linear velocity and track pitch can be obtained for each disc. Accordingly, the accurate rotation velocity of the disc motor can be calculated from the values of the linear velocity and track pitch and the address value of the maximum radius of the record area of data which are recorded on the information disc, whereby the high-speed search or high-speed reading can be performed adaptively according to the outermost circumference radius of the data record area.

According to a disc playback system of Claim 2 of the present invention, in the disc playback system of Claim 1, the track pitch detection means comprises a motion distance detection means for detecting a motion distance of the pickup, and when the information disc is loaded, the motion distance detection means calculates the number of tracks which have been passed by the pickup while the pickup is moving on the data record area on the information disc for a prescribed time period or by a prescribed distance, thereby detecting the track pitch of the information disc. Therefore, the accurate value of the track pitch can be obtained fur each disc. In addition, the accurate rotation velocity of the disc motor can be calculated from the value of the track pitch, the value of the linear velocity, and the address value of the maximum radius of the record area of data which are recorded on the information disc, whereby the high-speed search or high-speed reading can be performed adaptively according to the outermost circumference radius of the data record area.

A disc playback system according to Claim 3 of the present invention comprises: a pickup for reading first information data recorded on an information disc on which data are recorded at a constant linear velocity, from the information disc; a disc motor for rotating the information disc; a digital signal processing circuit for digitizing the first information data according to a playback format of the information disc; an interface control circuit for transmitting second information data as data which have been digitized by the digital signal processing circuit, to an external device; a buffer memory for temporarily containing the second information data which are requested by the external device via the interface control circuit; a linear velocity detection means for detecting a linear velocity of the information disc; and a playback velocity detection means for detecting a playback velocity of the information disc during playback of the information, and this disc playback system previously decides an initial value of a reference value for controlling a velocity of the disc motor on the basis of the linear velocity detected by the linear velocity detection means, a standard maximum value of a track pitch of the information disc, and a value of the maximum radius of a record area of data which are recorded on the information disc, when data are read from the information disc, sets again the reference value for controlling the velocity of the disc motor adaptively on the basis of the playback velocity of the information disc during playback, which is detected by the playback velocity detection means, the linear velocity detected by the linear velocity detection means, and a value of an address at which the playback is being performed, and decides the reference value for controlling the velocity of the disc motor. Therefore, no specific means for detecting the track pitch is required, and the value of the maximum radius of a record area of data which are recorded on the information disc can be calculated less expensively and more accurately, regardless of the values of the linear velocity and track pitch of the information disc. In addition, even when the previously measured linear velocity of the information disc has an error, the high-speed search or high-speed reading can be performed adaptively according to the outermost circumference radius of the data record area.

According to a disc playback system of Claim 4 of the present invention, in the disc playback system of Claim 3, the reference value for controlling the velocity of the disc motor is obtained when the reference value for the velocity control is set again, by making a compensation by multiplying the initial value of the motor velocity control reference value, by a compensation coefficient corresponding to a ratio between a radius position at which the information disc is being played back or an address value thereof, and the value of the maximum radius of the data record area or an address value thereof. Therefore, the maximum radius of the data record area on the information disc can be calculated more accurately, by making a compensation by multiplying a compensation coefficient corresponding to the radius position where the playback is being performed or its address value, regardless of the radius position where the information disc is being played back or its address value, or the values of the linear velocity and track pitch of the disc, as well as even when the previously measured linear velocity of the disc has an error, the high-speed search or high-speed reading can be performed adaptively according to the outermost circumference radius of the data record area.

According to a disc playback system of Claim 5 of the present invention, the disc playback system of any of Claims 1, 3 and 4 extracts address information concerning the information disc which is stored in a disc start position, from the first information data, and uses a value of a radius in a maximum circumference position obtained by the address information, as the value of the maximum radius of the record area of data which are recorded on the information disc. Therefore, the maximum radius of the data record area on the information disc can be calculated more accurately, regardless of the values of the linear velocity and track pitch of the information disc, whereby the high-speed search or high-speed reading can be performed adaptively according to the data storage capacity of the disc.

According to a disc playback system of Claim 6 of the present invention, the disc playback system of any of Claims 1, 3 and 4 comprises a storage means for containing address information of the outermost circumference among already read address information on the information disc, and uses a radius of an address position of the outermost circumference, read from the storage means, as the value of the maximum radius of the record area of data which are recorded on the information disc. Therefore, the outermost circumference radius of the addresses which have ever been accessed on the information disc can be calculated more accurately, regardless of the values of the linear velocity and track pitch of the information disc, whereby the high-speed search or high-speed reading can be performed adaptively according to the address of the outermost circumference radius which has ever been accessed on the information disc.

According to a disc playback system of Claim 7 of the present invention, in the disc playback system of any of Claims 1 to 6, the disc motor comprises: a CAV (Constant Angular Velocity) control circuit for rotating the information disc at a constant angular velocity. Therefore, the maximum radius of the data record area on the disc can be calculated more accurately, regardless of the values of the linear velocity and track pitch of the disc, whereby the high-speed search or high-speed reading can be performed adaptively according to the outermost circumference radius of the data record area.

According to a disc playback system of Claim 8 of the present invention, in the disc playback system of any of Claims 1 to 6, the disc motor comprises; a CLV (Constant Linear Velocity) control circuit for rotating the information disc at a constant linear velocity, and a variable clock generation circuit which can vary a comparison clock supplied to the CLV control circuit on the basis of the reference value for controlling the velocity of the disc motor. Therefore, the maximum radius of the data record area on the information disc can be calculated more accurately, regardless of the value of the track pitch, whereby the high-speed search or high-speed reading can be performed adaptively according to the outermost circumference radius of the data record area.

According to a disc playback system of Claim 9 of the present invention, in the disc playback system of any of Claims 1 to 6, the disc motor comprises: a first rotation control means for rotating the information disc at a constant angular velocity, a second rotation control means for rotating the information disc at a constant linear velocity, and a switch circuit for switching the first rotation control means and the second rotation control means. Therefore, the maximum radius of the data record area on the information disc can be calculated more accurately, regardless of the value of the track pitch, whereby the high-speed search or high-speed reading can be performed adaptively according to the outermost circumference radius of the data record area.

BEST MODE FOR CARRYING OUT THE INVENTION

Embodiment 1

Hereinafter, the first embodiment of the present invention corresponding to Claims 1 and 2 will be described with reference to FIG. 1.

Figure 1:
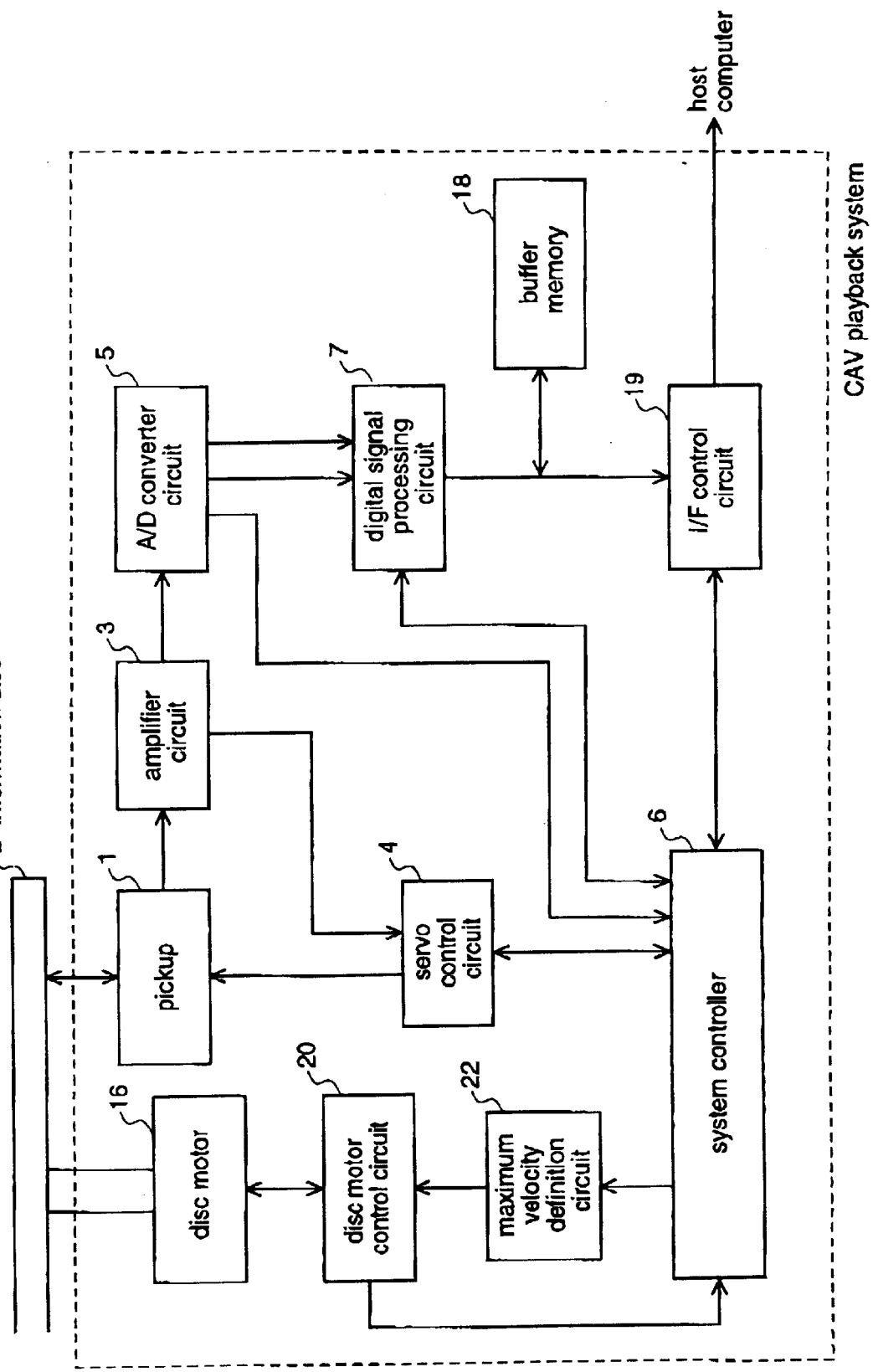
FIG. 1 is a block diagram illustrating a CAV playback system according to a first embodiment of the present intention.

FIG. 1 is a block diagram illustrating a CAV playback system according to the first embodiment.

Reference numeral 2 denotes an information disc on which data are recorded at a constant linear velocity. The information disc 2 has prescribed ranges of tolerances as to the linear velocity, the track pitch, and the innermost radius of the data record area in which data are recorded on the information disc 2. Numeral 1 denotes a pickup for reading information from the information disc 2, such as an optical pickup and a magnetic head. Numeral 3 denotes an amplifier circuit, which amplifies a signal read by the pickup 1 so as to have an appropriate amplitude. Numeral 16 denotes a disc motor, which rotates the information disc 2 at a predetermined velocity. Numeral 4 denotes a servo control circuit, which controls the pickup 1 to be in an appropriate position on a target track. Numeral 5 denotes an A/D converter circuit, which binarizes the signal transmitted from the amplifier circuit 3 and generates a PLL (Phase Locked Loop) clock which is synchronized with the binarized signal. Numeral 7 denotes a digital signal processing circuit, which processes a supplied digital signal in accordance with a playback format of data, in synchronization with the PLL clock. Numeral 18 denotes a buffer memory, which temporarily contains the signal processed by the digital signal processing circuit 7. Numeral 19 denotes an interface control circuit, which transmits the data stored in the buffer memory 18 to an external device. Numeral 20 denotes a disc motor control circuit, which rotates the disc motor 16 at a suitable velocity in accordance with an instruction from a maximum velocity definition circuit 22. Numeral 6 denotes a system controller, which controls the servo control circuit 4 and the interface control circuit 19.

The operation in the so-constructed disc playback system for controlling the rotation velocity of the information disc 2 is described with reference to FIG. 1.

When the information disc 2 is loaded into the disc playback system, the disc motor 16 rotates the information disc 2 at a prescribed velocity in the disc playback system. In order to control the rotation velocity of the disc motor 16, it is required to obtain values of the linear velocity and track pitch of the information disc 2.

Initially, the value of the linear velocity of the information disc 2 is measured for example by the following method. In cases where the pickup 1 has a means for detecting the range of motion of the information disc 2, when the information disc 2 is loaded into the apparatus, the pickup 1 is transported from the program start position of the information disc 2 toward the inner radius of the track. Then, the pickup 1 counts a playback clock for the signal processing until it detects the program start position again, whereby the linear velocity can be measured.

Next, the servo control circuit 4 detects the range of motion of the pickup 1 to obtain the value of the track pitch. For example, in cases where an encoder system or the like is included as a means for detecting the track pitch, when the information disc 2 is loaded, the information disc 2 is moved by a prescribed range or for a prescribed time period and the pickup 1 measures the number of tracks which have been passed during that time, whereby the track pitch can be measured.

Therefore, the rotation velocity of the disc motor 16 can be obtained from the measured values of the linear velocity and track pitch, and the address value of the maximum radius of the data record area in which the data are recorded on the information disc 2.

As described above, according to the disc playback system of the first embodiment, since the means for detecting the linear velocity and the track pitch of the information disc 2 are provided, the correct values of the linear velocity and the track pitch can be obtained for each disc. Therefore, the accurate rotation velocity of the disc motor 16 can be calculated from the values of the linear velocity and track pitch, and the address value of the maximum radius of the data record area in which data are recorded on the information disc 2, whereby the high-speed search or high-speed reading can be adaptively performed, according to the outermost circumference radius of the-data record area.

Embodiment 2

Hereinafter, the second embodiment of the present invention corresponding to Claims 3 and 4 will be described with reference to FIG. 2.

Figure 2:
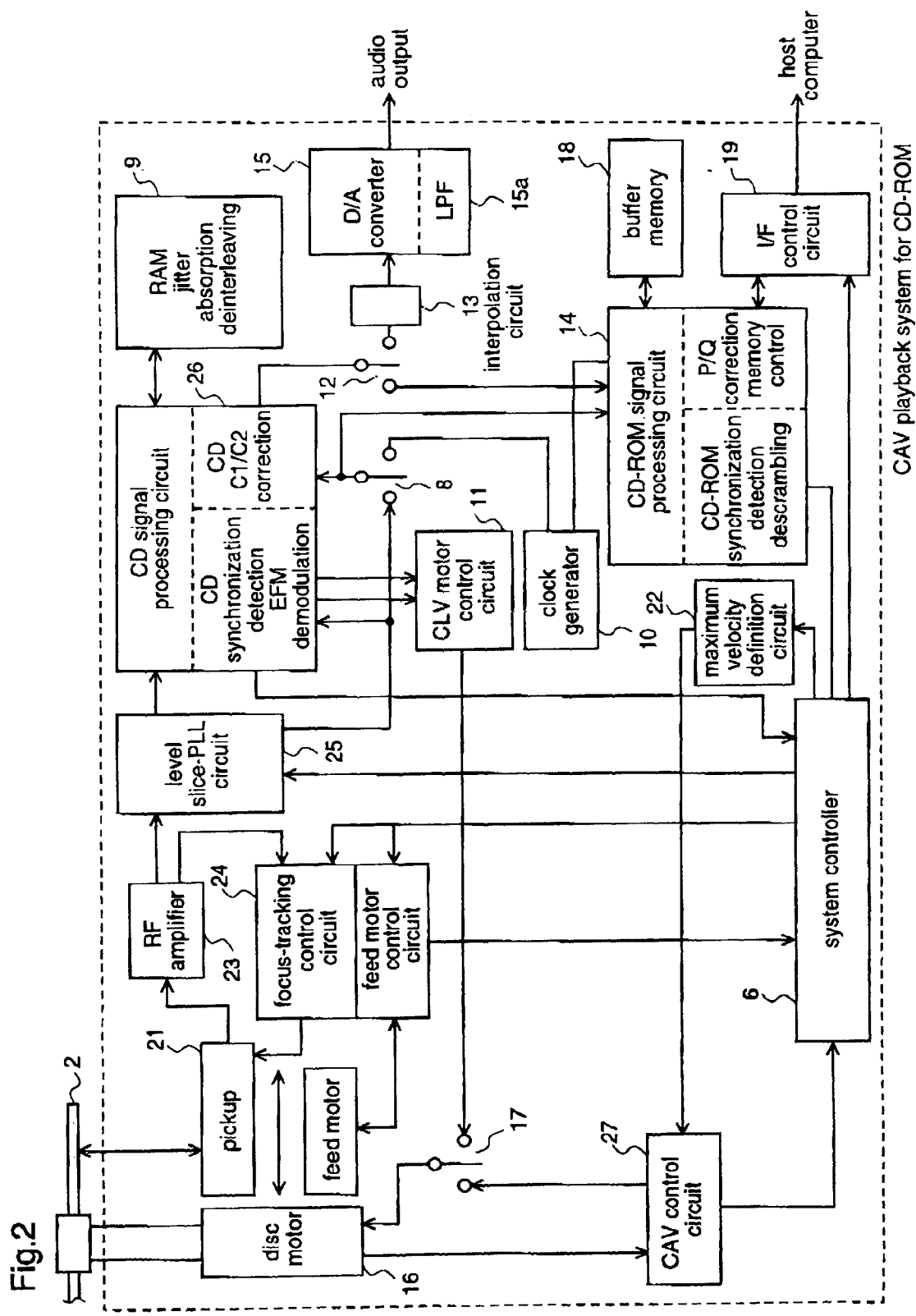
FIG. 2 is a block diagram illustrating a disc playback system which is applied to a CAV playback system for CD-ROM according to second and fourth embodiments of the present invention.

FIG. 2 is a block diagram illustrating a disc playback system which is applied to a CAV playback system for CD-ROM according to the second embodiment. When the pickup has no means for detecting the range of motion of the information disc, the rotation velocity of the disc motor can be obtained by the following method The same reference numerals as those in the first embodiment denote the same elements, and the descriptions thereof are not given here.

In FIG. 2, numeral 21 denotes an optical pickup for reading data recorded on the information disc 2. Numeral 23 denotes a RF amplifier for supplying a RF (Radio Frequency) signal read from the optical pickup 21. Numeral 24 denotes a focus-tracking control circuit/feed motor control circuit for supplying a focus error signal or tracking error signal extracted by the RF amplifier 23. Numeral 25 denotes a level slice-PLL circuit for supplying the RF signal amplified by the RF amplifier 23. Numeral 26 denotes a CD signal processing circuit for supplying an EFM signal which is obtained by binarizing the RF signal from the level slice-PLL circuit 25. Numeral 11 denotes a CLV motor control circuit for supplying a synchronization signal of a CD and a correction frame synchronization signal which are detected by the CD signal processing circuit 26. Numeral 9 denotes a RAM. Numeral 13 denotes an interpolation circuit for supplying an audio signal.

Numeral 15 denotes a D/A converter for supplying output data from the interpolation circuit 13. Numeral 15a denotes a LPF (low-pass filter) for outputting a playback audio signal from the D/A converter 15 to outside.

Further, numeral 14 denotes a CD-ROM signal processing circuit for supplying CD-ROM data. Numeral 10 denotes a clock generator for outputting a X'TAL (crystal) clock. Numeral 27 denotes a CAV control circuit for generating a drive signal for rotating the disc motor 16 at a prescribed-rotation. Numerals 8, 12 and 17 denote selectors.

The operation of the so-constructed disc playback system for controlling the rotation velocity of the information disc 2 is described with reference to FIG. 2.

In this figure, the RF signal (Radio Frequency) signal read from the information disc 2 by the optical pickup 21 is supplied to the RF amplifier 23. The RF amplifier 23 extracts a focus error signal or tracking error signal from the output of the optical pickup 21, then supplies the extracted signal to the focus-tracking control circuit/feed motor control circuit 24 as well as supplies an amplified RF signal to the level slice-PLL circuit 25.

The level slice-PLL circuit 25 can obtain an EFM (Eight to Fourteen Modulation) signal which is obtained by binarizing the RF signal, and simultaneously generates a PLL (Phase Locked Loop) clock which is synchronized with the EFM signal to read this EFM signal.

The EFM signal obtained by binarizing the RF signal by the level slice-PLL circuit 25 is supplied to the CD signal processing circuit 26. In addition, the PLL clock is supplied to the CD signal processing circuit 26 and the selector 8.

The CD signal processing circuit 26 detects the synchronization signal of the CD using the PLL clock, and performs separation or EFM demodulation of the data. Then, it extracts only sub code data from the demodulated data and supplies the sub code data to the system controller 6. The synchronization signal of the CD and the correction frame synchronization signal which are detected by the CD signal processing circuit 26 are supplied to the CLV motor control circuit 11. Further, data are written in the RAM 9 using the PLL clock as other main data.

The data correction process is carried out by reading data from the RAM 9 with reference to the clock supplied by the selector 8. At this time, in the case of playback under CAV control, the correction process is carried out using a playback PLL clock output by the level slice-PLL circuit 25, and in the (case of playback under CLV control, the correction process is carried out using the X'TAL (crystal) clock output by the clock generator 10. Then, the data which have been subjected to the correction process are supplied to the interpolation circuit 13 or the CD-ROM signal processing circuit 14 via the selector 12.

The switching between CAV and CLV is performed in accordance with an audio/ROM switching instruction signal output by the system controller 6. In the case of audio, the CLV playback is carried out, and in the case of CD-ROM, the CAV playback is carried out.

The switching of the selector 8 is performed in accordance with the audio/ROM switching instruction signal output by the system controller 6. The selector 8 selects the X'TAL clock output by the clock generator 10 when the instruction signal indicates audio, and selects the playback PLL clock output by the level slice-PLL circuit 25 when the instruction signal indicates a CD-ROM, to be supplied to the CD signal processing circuit 26.

The switching of the selector 12 is performed in accordance with the audio/ROM switching instruction signal output by the system controller 6. The selector 12 supplies data to the interpolation circuit 13 when the instruction signal indicates audio, and supplies data to the CO-ROM signal processing circuit 14 when the signal indicates a CD-ROM.

Only when an error flag is included in the data, the interpolation circuit 13 performs the interpolation of the data, and supplies the output to the D/A converter 15. The D/A converter 15 converts the data from digital into analog, and outputs a playback audio signal through the LPF (low-pass filter) 15*a*.

The CLV motor control circuit 11 compares the frequencies and phases of the synchronization signal of the CD and the correction frame synchronization signal, extracts error components, and generates a drive signal of the disc motor 16 to be supplied to the selector 17. To be more specific, the CLV motor control circuit 11 compares the frequencies and the phases of the 7.35-XHz CD synchronization signal and the 7.35-KHz correction frame synchronization signal.

The CD-ROM signal processing circuit 14 performs detection of CD-ROM synchronization from CD-ROM data and data descrambling, and executes a correction process for CD-ROM data and control on writing or reading of data into the buffer memory 18. The CD-ROM synchronization signal detection and the CD-ROM data descrambling are carried out using the clock supplied by the selector 8. Further, the data correction process and the control on the reading or writing of data into the buffer memory 18 are executed using the clock supplied by the clock generator 10. Then, the data read from the buffer memory 18 are transferred to a host computer as an external device through the interface control circuit 19. At this time, the writable area in the buffer memory 18 is detected and supplied to the system controller 6.

The interface control circuit 19 executes a communication control relating to interface such as transmission/receipt of an operation command and transmission/receipt of data to/from the host computer. The operation command is transmitted/received between the system controller 6 and the host computer via the interface control circuit 19.

Next, the CAV control circuit 27 generates a drive signal for rotating the disc motor 16 at a prescribed rotation conforming to the velocity reference value, from a rpm detection pulse obtained from the disc motor 16 and the velocity reference value supplied by the maximum velocity definition circuit 22. The generated drive signal is supplied to the selector 17

Further, the CAV control circuit 27 stores the outermost circumference radius address on the information disc 2 which has ever been accessed, then in cases where a method for setting this address as the maximum velocity of the system is adopted, compares the rpm detection pulse obtained from the disc motor 16, with the velocity reference value supplied by the maximum velocity definition circuit 22 when the outermost circumference address value is changed, and supplies a read inhibition signal to the system controller 6 until the disc has a velocity which is equal to or lower than the target velocity.

The switching of the selector 17 is performed in accordance with the audio/ROM switching instruction signal output by the system controller 6. The selector 17 selects the output of the CLV motor control circuit 11 when the instruction signal indicates audio, and selects the output of the CAV control circuit 27 when the signal indicates a CD-ROM, to be supplied to the disc motor 16.

The system controller 6 executes a search or operation control of the whole CD-ROM such as ON/OFF control of the operation of each circuit. Further, the system controller 6 generates the audio/ROM switching instruction signal from sub code data which have been demodulated by the CD signal processing circuit 26, and supplies the instruction signal to the level slice-PLL circuit 25 and the selectors 8, 12 and 17. The search instructions signal is supplied to the focus-tracking control circuit/feed motor control circuit 24.

A method for obtaining the linear velocity and track pitch of the information disc in the so-constructed CAV playback system for CD-ROM is described with reference to FIG. 2.

Initially, when the information disc 2 is loaded into the disc playback system, the optical pickup 21 is forcefully transported from the program start position of the information disc 2 toward the inner radius by one track. The optical pickup 21 counts the playback frame synchronization signal until it detects the program start position again, whereby the linear velocity of the information disc 2 can be obtained. There are various methods other than this for obtaining the linear velocity of the information disc.

Next, to obtain the track pitch of the information disc 2, a method for compensating the track pitch with respect to the standard maximum value (1.7 $\mu$m) with actually playing back data is adopted in this second embodiment. To be more specific, for example the disc rotation velocity calculated from the linear velocity of the information disc 2 when the information disc 2 is rotated at a prescribed rpm, the innermost radius of the disc and the standard maximum value of the track pitch (1.7 $\mu$m) is used as the initial value of the disc rotation velocity. Then, the playback velocity at a certain address can be calculated from the initial value of the rotation velocity and the value of the track pitch. More specifically, the accurate track pitch can be obtained by measuring the data reading velocity when the data are actually read, then comparing the data reading velocity with the calculated playback velocity, and compensating the track pitch by the addition or subtraction on the basis of the difference of these velocities. The data reading velocity can be easily obtained, for example, by counting the playback PLL clock which is output by the level slice-PLL circuit 25, without using special hardware.

The rotation velocity of the information disc 2 is decided using the linear velocity and track pitch calculated as described above, and a control reference value of the rotation velocity of the information disc 2 is set in the maximum velocity definition circuit 22.

Next, the method for calculating the rotation velocity of the disc is described in detail.

Initially, the radius position ($r_{max}$) of the information disc 2 at the time of the maximum velocity in the disc playback system is calculated using the following equation:
Equation (1)

$$\frac{\pi(r_{max}^2 - R_0^2)}{T_p} = \frac{V_i AD_{end}}{AD_{unit}}$$

$$r_{max} = \sqrt{R_0^2 + \frac{T_p V_1 AD_{end}}{\pi AD_{unit}}}$$

In the above equation, $R_o$ is an innermost radius of the record area in the information disc 2 (which is already known from the standards and 0.0249±0.002 m in the case of CD-ROM), $T_p$ is a track pitch, $AD_{unit}$ is an address value included in a unit time (75 in the case of CD), $AD_{end}$ is an address value of the information disc 2 at the time of the maximum velocity, and $V_1$ is the linear velocity of the information disc 2.

For setting the address value $AD_{end}$ on the information disc 2 at the time of the maximum velocity in the disc playback system, there are following methods. For example, a method of using the standard maximum recording time, a method of using the maximum time in the data record area read from TOC information, or a method of storing the outermost circumference address on the information disc 2 which has ever been accessed and using the stored address as the maximum velocity in the system can be used.

Then, the maximum playback velocity rate ($DR_{max}$) in the system is obtained from the calculated $r_{max}$ using the following equation, and further the rotation velocity $V_{rpm}$ of the information disc 2 is obtained from values of $r_{max}$ and $DR_{max}$.
Equation (2)

$$DR_{max} = \frac{2\pi r_{max}}{V_1} \frac{V_{rpm}}{60}$$

$$V_{rpm} = \frac{60 DR_{max} V_1}{2\pi r_{max}}$$

Here, the value of $V_{rpm}$ is set so as not exceed the upper limit of the value which is normally restricted in the mechanism.

Next, an example of the practical calculation of the rotation velocity of the information disc 2 is described.

For example, when the address value at the maximum velocity is assumed that $AD_{end}$=60:00:00(=3600 s), the linear velocity of the information disc 2 is assumed that $V_1$=1.3 m/s, the maximum velocity of the system is assumed that $DR_{max}$32× velocity, the rotation velocity is calculated in this way.

Initially, the radius position $r_{max}$ at 60:00:00 is calculated using the value of 1.6 $\mu$m as the standard track pitch in accordance with the Equation (1):

$$r_{max}=(0.0249^2+1.6\times10^{-6}\times1.3\times3600/\pi)^{1/2}=0.0548 \text{ m}$$

Then, when the obtained value of $r_{max}$ is substituted into Equation (2), the rotation velocity of the information disc 2 is:

$$V_{rpm}=(60\times32\times1.3)/(2\pi\times0.0548)=7249 \text{ rpm}$$

When the actual track pitch is 1.5 $\mu$m as the standard minimum value, the radius position $r_{max}$ is obtained in accordance with Equation (1).

$$r_{max}=(0.0249^2+1.5\times10^{-6}\times1.3\times3600/\pi)^{1/2}=0.0534 \text{ m}$$

When the obtained value of $r_{max}$ is substituted into Equation (2), the rotation velocity of the information disc 2 is:

$$V_{rpm}=(60\times32\times1.3)/(2\pi\times0.0534)=7439 \text{ rpm}$$

Further, when the actual track pitch is 1.7 $\mu$m as the standard maximum value, the radium position $r_{max}$ is obtained in accordance with Equation (1).

$$r_{max}=(0.0249^2+1.7\times10^{-6}\times1.3\times3600/\pi)^{1/2}=0.0561 \text{ m}$$

Then, the obtained value of $r_{max}$ is substituted into Equation (2), the rotation velocity of the Information disc 2 is:

$$V_{rpm}=(60\times32\times1.3)/(2\pi\times0.561)=7081 \text{ rpm}$$

In this embodiment, since the value of the track pitch is unknown at first, it is required to set the maximum velocity by using the standard maximum value of the track pitch, i.e., 1.7 $\mu$m, so as not to exceed the capability of the system. Further, from the above calculation example, in a case where the track pitch is set at 1.7 $\mu$m and the rotation velocity is set at 7081 rpm, the playback velocity at 60:00:00 is 31.25× (31.25 times faster) velocity when the actual track pitch is 1.6 $\mu$m, and 30.46× velocity when the actual track pitch is 1.5 $\mu$m, whereby the maximum playback velocity is reduced about 5% at the maximum.

Next, the information disc is played back, and when the halfway address is $AD_{end}$=20:00:00 (=1200 s) and the track pitch is 1.7 µm, the radius position $r_{max}$ at this address is 0.0383 m in accordance with Equation (1), and the rotation velocity of the disc is 7081 rpm in accordance with Equation (2). Then, the playback velocity at this time is obtained from the following Equation which is obtained by deforming Equation (2).

Equation (3)

$$DR_{max} = \frac{2\pi r_{max}}{60 V_1} V_{rpm}$$

When the above numeric values are substituted into Equation (3), the calculative playback velocity is:

$$DR_{max} = 2\pi \times 0.0383 \times 7081/(60 \times 1.3) = 21.8 \times \text{velocity}$$

When the actual playback velocity is, for example, 21.1× velocity, the actual track pitch can be calculated as follows. Initially, the actual radius position is obtained in accordance with the following equation which is obtained by deforming Equation (2).

Equation (4)

$$r_{max} = \frac{60 DR_{max} V_1}{2\pi V_{rpm}}$$

From this equation, $$r_{max} = (60 \times 21.1 \times 1.3)/(2\pi \times 7081) = 0.0370 \text{ m}$$

Then, the track pitch is obtained in accordance with the following equation which is obtained by deforming Equation (1).

Equation (5)

$$T_P = \frac{\pi (r_{max}^2 - R_0^2) AD_{unit}}{V_1 AD_{end}}$$

When using Equation (5), $$T_p = \pi(0.0370^2 - 0.0249^2)/(1.3 \times 1200) = 1.51 \text{ µm}$$

However, when the readout address is near the position of the inner radius, there is a possibility that the calculated value of the track pitch has a large error. Therefore, when the reference value of the velocity control of the disc motor 16 is decided on the basis of this track pitch value, there is a risk that the rotation velocity of the information disc 2 exceeds the maximum velocity in the system when reading data in the position of the outermost circumference radius. Thus, it is preferable to obtain the value of the rotation velocity of the information disc 2 with making a compensation by using a value obtained by multiplying the difference between the theoretically calculated track pitch and the track pitch of the information disc 2 which is being played back now by a predetermined compensation coefficient, as a compensation value for the actual track pitch. To be more specific, for example, when the track pitch obtained at the first access is 1.51 µm and the track pitch used for setting the rotation velocity of the disc motor 16 is 1.7 µm, the rotation velocity of the information disc 2 is re-decided using a value which is obtained by making compensation with half of the difference between these track pitches, i.e., Tp=1.605 µm. That is, from Equations (1) and (2), the rotation velocity is:

$$r_{max} = (0.0249^2 + 1.605 \times 10^{-6} \times 1.3 \times 3600/\pi)^{1/2} = 0.0549 \text{ m}$$

$$V_{rpm} = (60 \times 32 \times 1.3)/(2\pi \times 0.549) = 7236 \text{ rpm}$$

Hereinafter, by making compensation with half of the difference between the track pitches at each access, the obtained value is gradually converging to the true value of the track pitch.

Or, another method is adopted for making compensation by weighting a compensation coefficient according to a distance from the address at which the maximum velocity is obtained, in view of the fact that the maximum playback velocity can be set more accurately at a position on the information disc 2 nearer to the address at which the set maximum velocity is obtained. To be more specific, for example, the compensation coefficient at the address where the maximum velocity is obtained is set at 100%, the compensation coefficient is set at 0~100% according to the address position, and then the compensation is made by multiplying the compensation value of the calculated track pitch, by the compensation coefficient. In the above-mentioned embodiment, since the address at which the maximum velocity is obtained is 60:00:00 and the address at which the reading of data has been performed is 20:00:00, the compensation is made with 33.33% of the difference between the track pitch values at that time, i.e., 1.7 µm and 1.51 µm.

$$Tp = 1.7 + (1.51 - 1.7) \times 0.3333 = 1.637 \text{ µm}$$

Then, by using the value of Tp, the rotation velocity of the information disc 2 is compensated using Equations (1) and (2).

$$r_{max} = (0.0249^2 + 1.637 \times 10^{-6} \times 1.3 \times 3600/\pi)^{1/2} = 0.05353 \text{ m}$$

$$V_{rpm} = (60 \times 32 \times 1.3)/(2\pi \times 0.0663) = 7184 \text{ rpm}$$

Also in this method, when the compensation is made at every access, the value is gradually converging to the true track value and further when the access is made to a position nearer the address of the maximum velocity in the system which is supposed to be more accurate, the maximum playback velocity of the system can be attained earlier.

There are various track pitch compensation methods other than these, while when the compensation is made so that the data playback velocity at the address of the maximum velocity of the system on the information disc 2 becomes closer to the maximum velocity of the system, the same effects are obtained.

On the other hand, the prescribed amount of error is permitted also in the innermost radius of the information disc 2. When comparing the playback velocities at the address of 60:00:00, for example, in a case where the minimum radius is 0.0247 m and in a case where the maximum radius is 0.0251 m, the radius position when the rpm of the information disc 2 is 7081 rpm and the track pitch is 1.7 µm in the case of the minimum radius is obtained from Equation (1).

$$r_{max} = (0.0249^2 + 1.7 \times 10^{-6} \times 1.3 \times 3600/\pi)^{1/2} = 0.05605 \text{ m}$$

Then, from Equation (3), $$DR_{max} = (2\pi \times 0.05605 \times 7081)/(60 \times 1.3) = 31.97 \times \text{velocity}$$

In the case of the maximum radius, from Equation (1), $$r_{max} = (0.0251^2 + 1.7 \times 10^{-6} \times 1.3 \times 3600/\pi)^{1/2} = 0.05624 \text{ m}$$

Then, from Equation (3), $$DR_{max} = (2\pi \times 0.05624 \times 7081)/(60 \times 1.3) = 32.08 \times \text{velocity}$$

The difference of the playback velocities is approximately 0.35% at the maximum and it is a negligible range of error.

Even it the initially measured linear velocity or innermost radius of the information disc 2 has an error, because the actual data reading velocity is measured, the rotation velocity of the information disc 2 can finally be the maximum velocity of the system at the outermost circumference position in the data area.

In this second embodiment, the value of the track pitch is compensated. However, the same effects are obtained when the compensation is made by calculating the required rotation velocity of the disc directly from the address and playback velocity at which the playback is now being performed. In addition, also when the above value is multiplied by the compensation coefficient, the same effects are obtained.

When the accurate track pitch can be measured by the track pitch measuring means shown in the first embodiment at the loading of the information disc 2, the rotation velocity of the information disc 2 can be set by using the measured track pitch from the beginning. In addition, in order to set the rotation velocity of the disc more accurately, the above-mentioned method for compensating the rotation velocity of the disc on the basis of the address value and playback velocity at which the playback is being performed can be combined.

As described above, the disc playback system according to the second embodiment comprises the linear velocity detection means for detecting the linear velocity of the information disc 2 and the playback velocity detection means for detecting the current playback velocity of the information disc 2, and previously decides an initial value of the playback velocity on the basis of the detected linear velocity value, the standard maximum value of the track pitch and the value of the maximum radius of the data storage area in which data are recorded on the information disc, measures the playback velocity of data each time when the data on the information disc 2 are read out, and decides the reference value of the velocity control of the disc motor 16 on the basis of the current rotation velocity, linear velocity and innermost radius in the data record area on the information disc 2, the address value at the maximum playback velocity in the system and the address value on the information disc at the maximum velocity. Therefore, no special means for detecting the track pitch is required, and the value of the maximum radius of the data record area in which data are recorded on the information disc 2 can be calculated more inexpensively and more accurately, regardless of the values of the linear velocity and the track pitch of the information disc 2. In addition, even when the previously measured linear velocity of the information disc 2 has an error, the high-speed search and high-speed reading can be adaptively performed according to the outermost circumference radius of the data record area.

Further, since the compensation is made by multiplying, the compensation coefficient corresponding to the ratio between the address for obtaining the maximum velocity of the system, and the address at which the playback is being performed, when the track pitch value is compensated by multiplying the track pitch value by the compensation coefficient corresponding to the radius position at which the playback is being performed or its address value, the address value of the maximum radius of the data record area in which data are recorded on the information disc can be calculated more accurately, regardless of the radius position at which the playback is being performed or its address value, or the values of the linear velocity or track pitch of the disc. Therefore, even when the previously measured linear velocity of the disc has an error, the high-speed search and high-speed reading can be adaptively performed according to the outermost circumference radius of the data record area.

Embodiment 3

Hereinafter, the third embodiment of the present invention corresponding to Claims 5 and 6 will be described.

Initially, the maximum radius value of the data record area described in the first or second embodiment can be obtained by following methods.

For example, there is a method for extracting address information recorded on the information disc by means of a pickup, and using the radius at the outermost circumference position obtained from the extracted address information as the maximum radius of the data storage area.

In addition, there is a method for providing a storage means for storing the address information at the outermost circumference read at each time when the information disc is played back on the information disc, and using the data record area at the outermost circumference from the storage means as the maximum radius.

Further, there is a method for using the standard maximum record time as the maximum radius of the data record area, and a method for reading the maximum time in the data record area in which data are recorded on the information disc and using the same as the maximum radius of the data record area, and the like.

As described above, in the disc playback system according to the third embodiment, the outermost circumference position of the information disc or the radius at the outermost circumference address position read from the storage means is used as the maximum radius of the data storage area. Therefore, the outermost circumference radius of the addresses which have ever been accessed on the information disc can be calculated more accurately regardless of the values of the linear velocity or track pitch of the information disc, and the high-speed search and the high-speed reading can be adaptively carried out according to the address value of the outermost circumference radius on the information disc which has ever been accessed.

Embodiment 4

Hereinafter, the fourth embodiment of the present invention corresponding to Claims 7 to 9 will be described with reference to FIG. 2.

FIG. 2 is a block diagram illustrating a disc playback system which is applied to a CAV playback system for CD-ROM, according to the fourth embodiment. The same reference numerals as those in the second embodiment denote the same or corresponding elements or operations, and descriptions thereof are not given here.

In this figure, the information disc 2 on which data are recorded at constant linear velocity (CLV) is played back by rotating the disc motor 16 by the CAV method or CLV method. At this time, the switching between the CAV method and the CLV method is performed in accordance with the audio/ROM switching instruction signal which is output from the system controller 6. In the case of audio, the information disc 2 is played back by the CLV method and in the case of CD-ROM, the information disc 2 is played back by the CAV method. In addition, when the playback is performed by the CLV method, a variable clock generation circuit which can vary the reference value of the velocity control of the disc motor 16 is provided.

As described above, according to the disc playback system of the fourth embodiment, the information disc 2 is played back by the CAV method. Therefore, the loads on the disc motor 16 can be reduced, thereby reducing the costs and downsizing, and further the high-speed search can be performed.

In addition, the information disc 2 is played back by a wide-range CLV method having a playback velocity which is equal to that of the CAV method. Therefore, the loads to the disc motor 16 can be reduced, thereby reducing the costs and downsizing, and further the high-speed search can be performed Further, the CLV method and the CAV method are provided as the means for playing back the information disc 2, and the circuit for switching the methods is further included. Therefore, regardless of the value of the track pitch, the maximum radius of the data storage area in the information disc 2 can be calculated more accurately, and the high-speed search and high-speed reading can be performed adaptively according to the maximum radius of the data storage area.

Industrial Availability

As described above, the disc playback system according to the present invention relates to a disc playback system for controlling the disc rotation velocity and can obtain the maximum playback velocity in the system even in the case of a disc having a different track pitch therefore, it is extremely useful as the one for realizing an efficient disc playback system.

What is claimed is:

1. A disc playback system comprising:
    a pickup for reading first information data recorded on an information disc on which data are recorded at a constant linear velocity, from the information disc;
    a disc motor for rotating the information disc;
    a digital signal processing circuit for digitizing the first information data according to a playback format of the information disc;
    an interface control circuit for transmitting second information data which are the data digitized by the digital signal processing circuit, to an external device;
    a buffer memory for temporarily containing the second information data which are requested by the external device via the interface control circuit;
    a linear velocity detection means for detecting a linear velocity of the information disc; and
    a track pitch detection means for detecting a track pitch of the information disc,
    said disc playback system deciding a reference value for controlling a velocity of the disc motor, on the basis of the linear velocity detected by the linear velocity detection means, the track pitch detected by the track pitch detection means, and a value of a maximum radius of a record area of data which are recorded on the information disc.

2. The disc playback system of claim 1 wherein
    the track pitch detection means comprises a motion distance detection means for detecting a motion distance of the pickup, and
    when the information disc is loaded, the motion distance detection means calculates the number of tracks which have been passed by the pickup while the pickup is moving on the data record area on the information disc for a prescribed time period or by a prescribed distance, thereby detecting the track pitch of the information disc.

3. The disc playback system of claim 1 extracting address information concerning the information disc which is stored in a disc start position, from the first information data, and using a value of a radius in a maximum circumference position obtained by the address information, as the value of the maximum radius of the record area of data which are recorded on the information disc.

4. The disc playback system of claim 1 comprising a storage means for containing address information of the outermost circumference among already read address information on the information disc, and
    using a radius of an address position of the outermost circumference, read from the storage means, as the value of the maximum radius of the record area of data which are recorded on the information disc.

5. A disc playback system comprising:
    a pickup for reading first information data recorded on an information disc on which data are recorded at a constant linear velocity, from the information disc;
    a disc motor for rotating the information disc;
    a digital signal processing circuit for digitizing the first information data according to a playback format of the information disc;
    an interface control circuit for transmitting second information data as data which have been digitized by the digital signal processing circuit, to an external device;
    a buffer memory for temporarily containing the second information data which are requested by the external device via the interface control circuit;
    a linear velocity detection means for detecting a linear velocity of the information disc; and
    a playback velocity detection means for detecting a playback velocity of the information disc during playback of the information,
    said disc playback system
    previously deciding an initial value of a reference value for controlling a velocity of the disc motor on the basis of the linear velocity delected by the linear velocity detection means, a standard maximum value of a track pitch of the information disc, and a value of the maximum radius of a record area of data which are recorded on the information disc,
    when data are read from the information disc, setting again the reference value for controlling the velocity of the disc motor adaptively on the basis of the playback velocity of the information disc during playback, which is detected by the playback velocity detection means, the linear velocity detected by the linear velocity detection means, and a value of an address at which the playback is being performed, and
    deciding thee reference value for controlling the velocity of the disc motor.

6. The disc playback system of claim 5 wherein
    the reference value for controlling the velocity of the disc motor is obtained,
    when the reference value for the velocity control is set again, by making a compensation by multiplying the initial value of the motor velocity control reference value, by a compensation coefficient corresponding to a ratio between a radius position at which the information disc is being played back or an address value thereof, and the value of the maximum radius of the data record area or an address value thereof.

7. The disc playback system of claim 6, extracting address information concerning the information disc which is stored in a disc start position, from the first information data, and using a value of a radius in a maximum circumference position obtained by the address information, as the value of the maximum radius of the record area of data which are recorded on the information disc.

8. The disc playback system of claim 6 comprising a storage means for containing address information of the outermost circumference among already read address information on the information disc, and using a radius of an address position of the outermost circumference, read from the storage means, as the value of the maximum radius of the record area of data which are recorded on the information disc.

9. The disc playback system of claim 5 extracting address information concerning the information disc which is stored in a disc start position, from the first information data, and using a value of a radius in a maximum circumference position obtained by the address information, as the value of the maximum radius of the record area of data which are recorded on the information disc.

10. The disc playback system of claim 5 comprising a storage means for containing address information of the outermost circumference among already read address information on the information disc, and using a radius of an address position of the outermost circumference, read from the storage means, as the value of the maximum radius of the record area of data which are recorded on the information disc.

11. The disc playback system of any of claims 1–10 wherein the disc motor comprises:

a CAV (Constant Angular Velocity) control circuit for rotating the information disc at a constant angular velocity.

12. The disc playback system of any of claims 1–10 wherein the disc motor comprises:

a CLV (Constant Linear Velocity) control circuit for rotating the information disc at a constant linear velocity, and a variable clock generation circuit which can vary a comparison clock supplied to the CLV control circuit on the basis of the reference value for controlling the velocity of the disc motor.

13. The disc playback system of any of claims 1–10 wherein the disc motor comprises:

a first rotation control means for rotating the information disc at a constant angular velocity, a second rotation control means for rotating the information disc at a constant linear velocity, and a switch circuit for switching the first rotation control means and the second rotation control means.

* * * * *

UNITED STATES PATENT AND TRADEMARK OFFICE
CERTIFICATE OF CORRECTION

PATENT NO. : 6,751,174 B1  Page 1 of 1
DATED : June 15, 2004
INVENTOR(S) : Yorio Takahashi It is certified that error appears in the above-identified patent and that said Letters Patent is hereby corrected as shown below:

<u>Title page,</u>
Item [22], PCT Filed, please change "September 30, 2000" to -- August 30, 2000 --.

Signed and Sealed this

Tenth Day of May, 2005

JON W. DUDAS
*Director of the United States Patent and Trademark Office*